United States Patent [19]

Van Marter et al.

[11] 4,215,428
[45] Jul. 29, 1980

[54] TIME RATIO CONTROLLED INVERTER

[75] Inventors: Charles W. Van Marter, Syracuse; Raymond L. Rofini, Liverpool; Laurence D. Smith, North Syracuse, all of N.Y.

[73] Assignee: The United States of America as represented by the Secretary of the Navy, Washington, D.C.

[21] Appl. No.: 120,410

[22] Filed: Mar. 3, 1971

[51] Int. Cl.³ .............................................. H04B 1/02
[52] U.S. Cl. .................................................... 367/137
[58] Field of Search ............... 340/3 R, 5 R, 1 R, 15; 307/264, 265, 266, 267, 260; 367/137

[56] References Cited
U.S. PATENT DOCUMENTS
3,622,960  11/1971  Barron et al. ........................ 367/137

Primary Examiner—Richard A. Farley
Attorney, Agent, or Firm—Richard S. Sciascia; Don D. Doty; William T. Skeer

[57] ABSTRACT

Disclosed is a transistorized sonar transmitter which includes a power supply, a variable frequency, variable power, switching output stage, the switching of which is actuated by suitable drive signals from a control signal generator and amplifier. The power output from said switching stage is controlled by a time-ratio-control circuit which regulates the voltage thereof by means of a variable duration TRC drive signal from said control signal generator and amplifier, the duration of which is proportional to the power output thereof.

10 Claims, 5 Drawing Figures

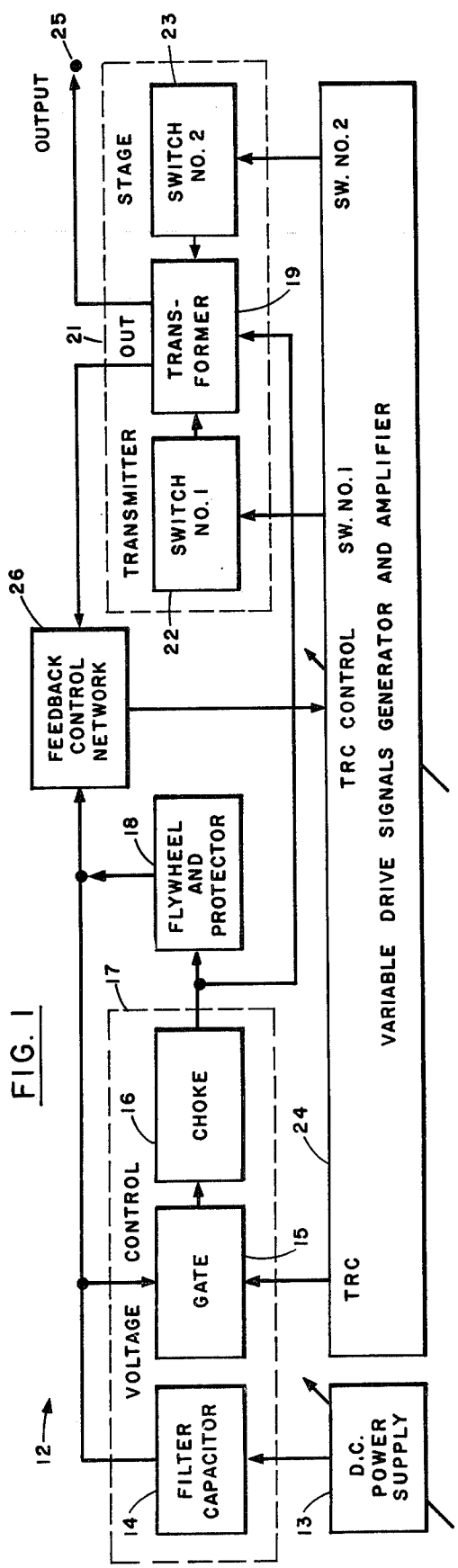
FIG. 1
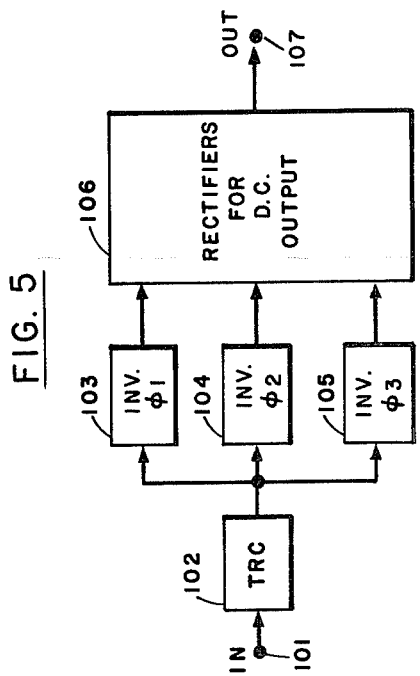
FIG. 5
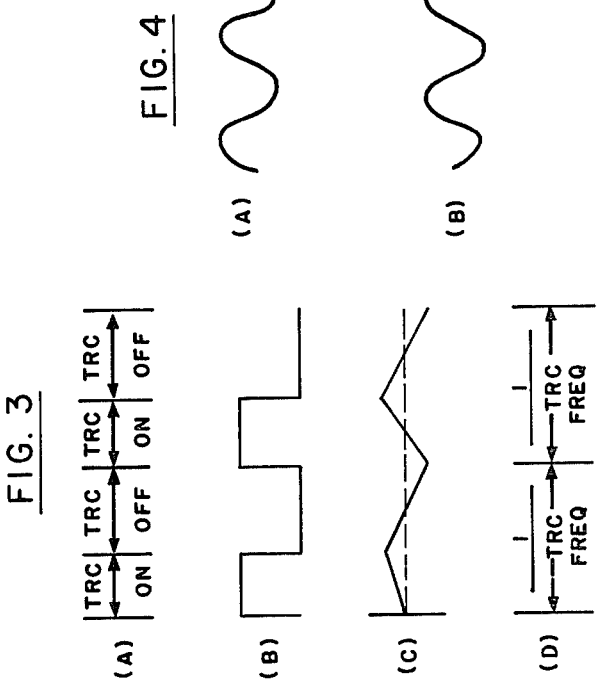
FIG. 3
FIG. 4

TIME RATIO CONTROLLED INVERTER

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention relates, in general, to transmitters for the broadcast of energy throughout a predetermined environmental medium, and, in particular, it pertains to a transistorized sonar transmitter for effecting the broadcast of acoustical energy throughout an aqueous medium, such as sea water or the like.

DESCRIPTION OF THE PRIOR ART

Copious quantities of sonar transmitters are in existence today, many of which are eminently satisfactory for their intended purpose. However, heretofore, practically all of said transmitters were constructed of electronic circuits incorporating vacuum tubes, unless their operational requirements were such that only a small amount of power was needed. As a general rule, the power requirements for sonar transmitters are considerable, due to the nature of the operational medium. Thus, for example, if space and weight were of importance during any given operational situation, the bulk and mass thereof had to be reduced in such manner as would ordinarily cause the desired broadcast results to be sacrificed, rather than be optimized. Accordingly, transmitters having large bulk and mass necessitated adverse compromises to be made with respect thereto, as well as with respect to associated equipment, such as carrier vehicles and the like. Hence, although useful for some purposes, the transmitters of the prior art—and especially the sonar transmitters of the prior art—leave a great deal to be desired from numerous standpoints.

SUMMARY OF THE INVENTION

The instant invention is a compact, variable, high-powered, transistorized sonar transmitter which facilitates its being used where weight and space considerations are of importance. It includes a power supply, a signal controlled switch drive output stage, the high power output of which is regulated by a time-ratio controlled direct current voltage circuit combined with a negative feedback network and a generator and amplifier for supplying drive signals of predetermined frequency and duration for the control thereof.

The subject invention, of course, overcomes many of the disadvantages of the prior art transmitters, especially with respect to size, weight, and structural characteristics, as well as from the functional and versatility standpoints.

It is, therefore, an object of this invention to provide an improved method and means for broadcasting a predetermined type of energy throughout a predetermined environmental medium that is compatible therewith.

Another object of this invention is to provide an improved transistorized transmitter.

Another object of this invention is to provide a compact, light-weight, variable-high-powered sonar transmitter.

A further object of this invention is to provide a transistorized transmitter whose power may be varied in accordance with the varying frequency and duration of a time-ratio-control (TRC) signal for any fixed load.

Still another object of this invention is to provide an improved method and means for supplying a constant or variable frequency drive to a multiple phase induction motor and, thus, obtaining a constant or variable torque therefrom.

Still another object of this invention is to provide a time-ratio-controlled square-wave inverter which can effect control of the output thereof from the standpoints of voltage, current, phase, and/or frequency, as desired.

Another object of this invention is to provide an improved method and means for driving a light high speed motor at low speeds, regardless of whether it is designed for being powered by an alternating current (AC) voltage or a direct current (DC) voltage.

Still another object of this invention is to provide a TRC regulated inverter system that incorporates a plurality of similar inverter circuits in such manner as to be a multiple phase inverter.

A further object of this invention is to provide a transistorized transmitter having a simple transistorized overload protection network incorporated therein.

Another object of this invention is to provide a transistorized sonar, radar, and the like transmitter that may be easily and economically manufactured, stored, operated, and maintained.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 1 is a functional block diagram of the transmitter system constituting this invention;

FIG. 3 is a graphic representation of the timing and voltage control effected by the time-ratio-control circuit of FIGS. 1 and 2;

FIG. 4 is a graphic representation of typical signal waveforms which may be generated by the control signal generator and amplifier circuit for the purpose of driving the switching circuits of the devices of FIGS. 1 and 2, respectively;

FIG. 5 is a simplified block diagram of one possible embodiment of a TRC regulated multiple phase inverter which may incorporate the subject invention to an advantage.

DESCRIPTION OF THE PREFERRED EMBODIMENT

Figure 2:
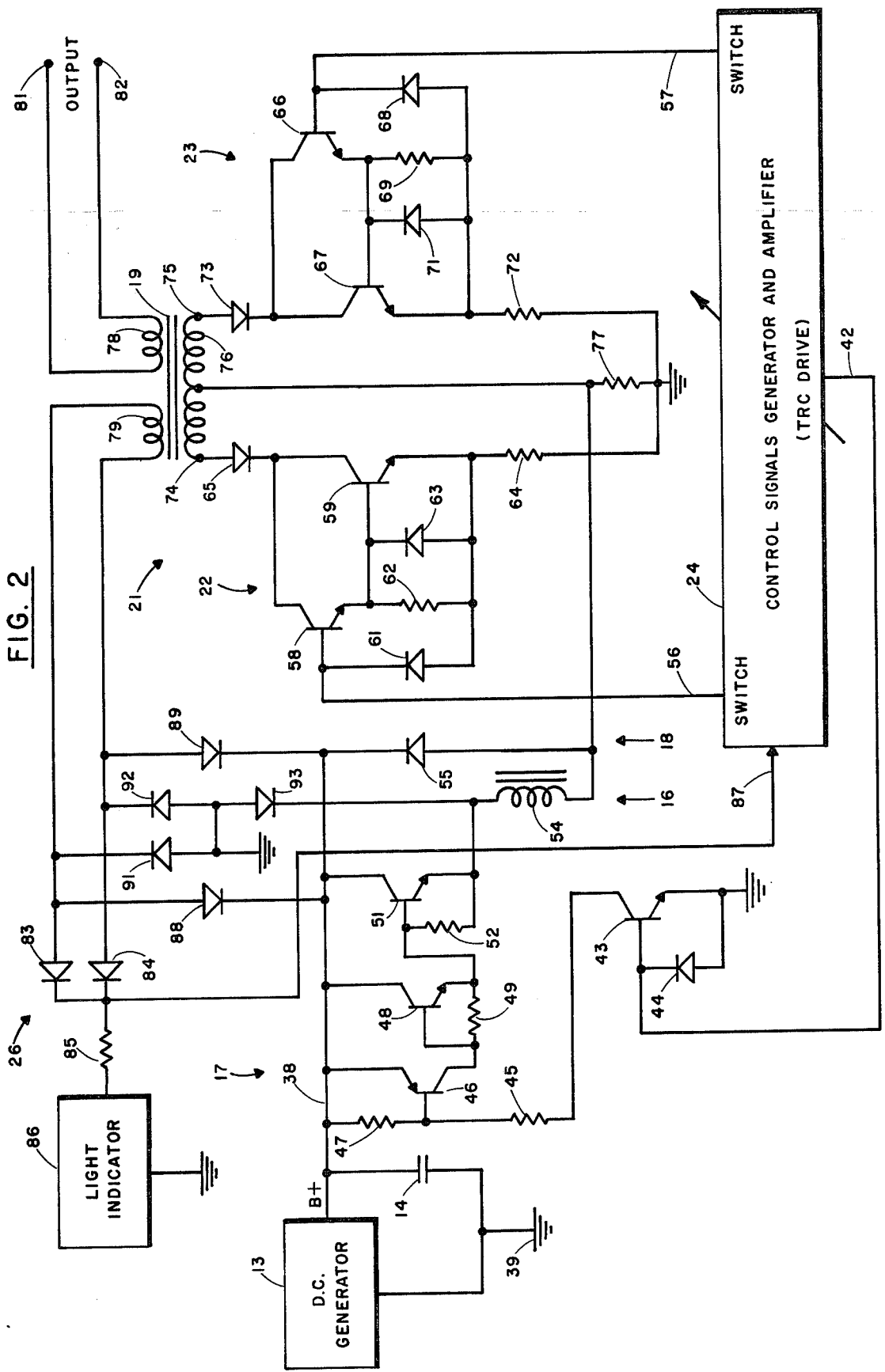
FIG. 2 is a schematic and block diagram of the embodiment of the invention depicted in FIG. 1.

Referring now to FIG. 1, there is shown a generic embodiment 12 of the device constituting the subject invention. Included therein is a direct current (DC) power supply 13 for generating a B+ voltage at the output thereof. Of course, said power supply may be composed of an alternating current (AC) generator combined with suitable rectifiers and filters, or, in the alternative, it may be any suitable DC voltage supply, such as a DC generator, batteries, or the like.

The output of power supply 13 is connected to a storage capacitor 14, which, incidentally, also acts as capacitance filter for the B+ voltage produced at the output thereof. Capacitor 14 has its output connected to the data input of a gate circuit 15, the output of which is connected to the input of a choke 16. Of course, the aforementioned combination of capacitor 14, gate 15, and choke 16 constitute a voltage control circuit 17 which, in effect, produces a regulated B+ voltage that is proportional to and, thus, controls the power output of the invention, as will be explained more fully below.

The output of choke 16 is obviously the output of voltage control circuit 17. It is connected to the input of a flywheel overvoltage protector 18 and the center tap of the primary winding of a power transformer 19, located in a transmitter output stage 21. The output of overload protector 18 is connected to the output of capacitor 14 and to the data input of gate 15.

Transmitter out stage 21 also includes a pair of switches 22 and 23 which have their inputs respectively connected for response to predetermined "on" and "off" type drive signals and their outputs respectively connected to the terminals of the aforesaid primary winding of output transformer 19.

A variable drive signal generator and amplifier 24 is employed for producing a trio of output drive signals which are, in turn, used to control the opening and closing of the aforesaid gate 15 and to actuate switches 22 and 23, respectively. Generator and amplifier 24 also has an input to a portion thereof to which is supplied a signal that effects the proper timing for the time-ratio-control (TRC) signal that opens and closes gate 15 (such as, for example, a series connected voltage controlled oscillator, detector, and envelope integrator). As will be discussed subsequently, FIGS. 3(A), 3(B), 4(A), and 4(B) represent ideal waveforms of signals that may be used for such purposes, although it should be understood that other appropriate ones may be used, too. Variable drive signals generator and amplifier 24 is, of course, composed of circuits that are well known and conventional per se; hence, their design and/or selection would be obvious to one skilled in the art having the benefit of the teachings presented herewith. Accordingly, in order to keep this disclosure as simple as possible, it will not be discussed in detail.

The output of the entire device constituting this invention is taken from one of the secondary windings of transformer 19 and, thus, is connected to output terminal 25 for such purpose. Output terminal 25 is, of course, adapted for being connected to the input of a suitable transmitting transducer or other utilization apparatus (not shown).

Another secondary winding of transformer 19 is connected through a negative feedback network 26 to the B+ voltage output of the aforesaid capacitor 14. The output of feedback network 26 is connected to the TRC control input of drive signals generator 24 to effect control of the TRC drive signal produced thereby, to thus prevent the overload of transformer 19 and/or the utilization apparatus associated therewith.

In FIG. 2, there is shown, in schematic detail, the circuitry of generic embodiment 11 depicted in FIG. 1 and discussed above. To simplify the description thereof and to facilitate correlating the devices of FIGS. 1 and 2, the same reference numerals have been used therein as necessary to identify like component parts.

Referring now to FIG. 2, there is shown a direct current (DC) power supply 13, the output of which is connected to a B+ voltage bussbar 38. Connected between said B+ bussbar 38 and a ground 39 is the aforesaid filter capacitor 14. Of course, said ground is likewise appropriately connected to the aforesaid direct current generator 13.

In this particular preferred embodiment of the invention, variable control signal generator and amplifier device 24 is also employed. This device, as previously suggested, is merely a trio of signal generators, two of which are designed for the purpose of operating the aforementioned first and second switches 22 and 23, and the other of which is designed to produce a square wave output signal, the duration of which is proportional to the amplitude of an input signal supplied thereto, as will be discussed more fully subsequently during the explanation of the operation of the entire invention.

One of the outputs 42 of variable control signal generator and amplifier 24 supplies a time-ratio-control substantially square wave type of signal, and it is connected to the base of a 2N3500 NPN transistor 43. The emitter of said transistor 46 is directly connected to ground, and the cathode of a 1N3600 diode 44 is connected to the base thereof, while the anode of said diode 44 is likewise connected to said ground. The collector of transistor 43 is connected through a resistor 45 to the base of a 2N3634 PNP transistor 46. The base of transistor 46 is connected through a resistor 47 to the aforesaid B+ voltage bussbar 38, and the emitter thereof is likewise connected to said B+ voltage bussbar 38. The collector of transistor 46 is directly connected to the base of an SDT8722 NPN transistor 48 and through a resistor 49 to the emitter thereof. The collector of transistor 48 is likewise connected to the aforesaid B+ voltage bussbar 38.

The emitter of transistor 48 is connected to the base of an SDT8722 NPN transistor 51, the collector of which is connected to B+ bussbar 38. A resistor 52 is connected between the base and emitter of transistor 51, the latter of which is connected to one of the terminals of an inductance 54 (effectively the aforementioned choke 16). The other terminal of inductance 54 is connected to the anode of a 1N3893 diode 55, the cathode of which is, in turn, connected to the aforesaid B+ voltage bussbar 38. Diode 55 may either be incorporated in or act as the aforementioned flywheel and overload protector 18, as the case may be.

Of course, it may readily be seen, that transistors 43, 46, 48, and 51 and their associated circuitry constitute the aforementioned current control gate 15 of FIG. 1. And, in addition, when said capacitor 14, said gate 15, and said choke 16 are combined as indicated, they constitute the aforementioned DC voltage control circuit 17 of FIG. 1.

Output 56 of variable signal generator and amplifier 24 is connected to the base of an SDT1012 NPN driver transistor 58. The emitter of transistor 58 is directly connected to the base of an SDT8803 NPN transistor 59, and the collectors of both thereof are interconnected. A 1N3600 diode 61 has its cathode connected to the base of transistor 58 and its anode to the emitter of transistor 59. Connected between the emitter of transistor 58 and the emitter of transistor 59 is a resistor 62, and connected in parallel with resistor 62 is a 1N645 diode 63, the cathode of which is connected to the base of transistor 59, and the anode of which is connected to the emitter thereof. The emitter of transistor 59 is connected through a resistor 64 to ground, and the collector thereof is connected to the cathode of a 1N3893 diode 65.

Switch control output 57 of control signal generator and amplifier 24 is connected to the base of SDT1012

NPN driver transistor 66 of the aforementioned second switch 23 of transmitter out stage 21, shown in FIG. 1. The emitter of transistor 66 is directly connected to the base of SDT8803 NPN transistor 67. To the base of transistor 66 is connected to the cathode of 1N3600 diode 68, with the anode thereof directly connected to the emitter of the aforesaid transistor 67. A resistor 69 is connected between the emitter of transistor 66 and the anode of diode 68, and a 1N645 diode 71 is connected in parallel therewith in such manner that its cathode is connected to the base of transistor 67, while its anode is connected to the emitter thereof. The emitter of transistor 67 is connected through a resistor 72 to ground, while the collector thereof is connected to the collector of the aforesaid transistor 66 and to the cathode of a 1N3893 diode 73.

The anodes of diodes 65 and 73 are respectively connected to the end terminals 74 and 75 of a primary winding 76 of the aforementioned transformer 19 of transmitter out stage 21. The center tap of primary winding 76 of transformer 19 is connected through a resistor 77 to ground, and it is also connected to one of the terminals of the aforementioned inductance 54 and to the anode of diode 55.

Transformer 19 has two secondary windings 78 and 79, the former of which is connected to output terminals 81 and 82, which was previously represented as a single output 25 in the block diagram of FIG. 1. The output terminals of secondary winding 79 of transformer 19 are respectively connected to the anodes of a pair of 1N645 diodes 83 and 84, the cathodes of which are interconnected and connected through a resistor 85 to a suitable light indicator 86 that is also properly connected to ground for completion of the circuit thereof. The common junction of the cathoades of diodes 83 and 84 are connected to the overload control input 87 of the aforementioned variable signal control generator and amplifier 24 for the purpose of regulating the duration of the time-ratio-control drive signal for overload prevention purposes, as will be discussed more fully below. Connected to the anode of diode 83 is the anode of a 1N1202 diode 88, the cathode of which is connected to the aforesaid B+ voltage bussbar 38, and connected to the anode of diode 84 is the anode of another 1N202 diode 89, the cathode of which is likewise connected to the aforesaid B+ voltage bussbar 38. The anodes of diodes 83 and 84 are respectively connected to the cathode of a pair of 1N1202R diodes 91 and 92, the anodes of which are interconnected and connected to ground. Also connected to the anodes of diodes 91 and 92 is the anode of an A28BR "fly-wheel" diode 93, the cathode of which is connected to the common junction of the emitter of the aforesaid transistor 52 and one of the terminals of inductance 54.

Because FIGS. 3 and 4 do not disclose any structure but, instead, merely portray various and sundry waveforms and timing diagrams of signals which occur within the devices of FIGS. 1 and 2, they will be explained more fully in conjunction with the operation of the invention to be discussed below.

The device of FIG. 5 comprises a plurality of output stages, each of which produces a different frequency output signal, with said plurality thereof being voltage controlled by a time-ratio-control (TRC) circuit. Specifically, a direct current (DC) voltage is applied to input terminal 101 which is connected to the input of a TRC circuit 102, the output of which is connected to the inputs of a $\phi_1$ inverter 103, a $\phi_2$ inverter 104, and so forth, to a $\phi_n$ inverter 105, wherein $\phi_1$, $\phi_2$, ... $\phi_n$ are different predetermined frequencies. The outputs thereof are respectively connected to a like plurality of rectifiers 106 for direct current output, each voltage of which occurs at terminal 107 and effectively determines the power supplied to a like number of transmitting transducers or other utilization apparatus (not shown) operating at the aforesaid respective frequencies.

MODE OF OPERATION

The operation of the invention will now be discussed briefly in conjunction with all of the figures of the drawing.

Because the devices of FIGS. 1 and 2 are generic and specific embodiments of the invention, respectively, the operation thereof will, in essence, be the same. Hence, no distinction will be made therebetween during the discussion of the operation of the invention unless something of critical significance exists therein that requires separate explanation.

As previously indicated, to some extent, the subject invention processes by means of transistorized circuitry an input power signal into an output power signal capable of driving a sonar or other electroacoustical transducer and/or some other appropriate utilization apparatus not structurally disclosed per se herein.

The timing of the respective drive signals generated by variable drive signals generator and amplifier 24 is an exceedingly important aspect of the invention; however, at the outset, it should perhaps be noteworthy that the signals ideally depicted in FIG. 3 have the relationship of four times the frequency of the signals illustrated in FIG. 4.

FIG. 3(A), for example, discloses a typical TRC "on-off" timing diagram which could occur during the normal operation of the invention. Assuming such timing to be in effect for reasons to be explained later, a TRC drive signal of the type represented by FIG. 3(B) is generated at output 45 thereof. Obviously, in this particular instance, the more positive portion of the square wave occurs when the voltage control circuit needs to be turned "on" in order to effectively increase the B+ (or controlled signal) voltage the proper amount, and the zero or more negative portion thereof occurs when the voltage control circuit needs to be turned "off", in order to effectively decrease the B+ (or controlled signal) voltage the proper amount, so that it will hunt about some direct current voltage preset by D.C. power supply 13.

At the time the TRC is "on", the positive signal from the TRC drive 45 causes transistors 43, 46, 48, and 51 to conduct and thereby cause a pulse current to flow through inductance 54 which, in turn, causes the B+ voltage to increase at the center tap of primary winding 76 of transformer 19 as a result of inductance 54 drawing a pulse current from capacitor 14 and the B+ source, viz., D.C. generator 13. When the positive TRC drive signal is removed, the current is maintained through inductance 54 by the "free-wheeling" diode 93. As a result thereof, the current through inductance 54 has a waveform similar to that shown in FIG. 3(C), the period of which is defined by FIG. 3(D). By varying the ratio of the TRC "on" time to the "off" time, the current level to the primary winding center tap of transformer 19 can be varied for a fixed load, and, of course, so doing causes the power supplied thereto to be varied in proportion thereto.

The function of the inverter portion of the invention is to produce a square wave voltage at output terminals 81 and 82. This is accomplished by alternately closing switches 22 and 23 through the respective actions of the signals of FIG. 4(A) and FIG. 4(B), supplied by outputs 56 and 57 of variable drive signals generator and amplifier 24. Again, it should be understood that the TRC frequency of such switching is completely dependent of the aforementioned frequency. As a matter of fact, in actual practice, the TRC frequency will be exactly four times the switching frequency.

For example, when the signal of FIG. 4(A) is applied to the base of transistor 58 in switch 22, it conducts, thereby causing a somewhat similar signal to be applied to the base of transistor 59 which, in turn, likewise causes it to conduct, too. Conduction of transistor 59 causes current to flow through the left hand portion of primary winding 76 of transformer 19, which, by normal transformer action produces a reversed polarity squarewave output signal to appear across secondary winding 78 and output terminals 81 and 82.

The circuitry of switch 23 functions in a manner identical to that of switch 22 because it is identical thereto. But because it is actuated by an oppositely polarized signal like that of FIG. 4(B), its actuation is, in this particular instance, 180° out of phase from the actuation of switch 22. Hence, the drive signals received from outputs 56 and 57 of generator and amplifier 24 may be used to timely and alternately open and close switches 22 and 23.

In the event the current flow through the primary winding of transformer 19 is sufficiently great to overload it and perhaps switches 22 and 23 as well, by normal transformer action it is picked up and converted to an overload control signal by the feedback control network, after which it is supplied to input 87 of the TRC generator portion of control signals generator and amplifier 24. The amplitude of said control signal causes the duration of the generated TRC "on" signal of FIG. 3(B) to be varied in inverse proportion therewith, thereby effecting a negative feedback control thereof to reduce the current supplied to the center tap of primary winding 76 of transformer 19 whenever it has become too great for circuit safety.

The aforementioned diode 93 has been previously defined as being a "fly-wheel" type of device which keeps the current flowing in slightly decreasing quantity through inductance 54 during that portion of the TRC cycle when the TRC signal is "off". Hence, the current waveform of FIG. 3(C) is that which passes through inductance 54. As may readily be seen therefrom, over any given TRC "on-off" cycle, said current hunts about a predetermined current value and, therefore, the B+ voltage, which is proportional thereto, likewise hunts about a B+ voltage preset to be at the primary winding center tap of transformer 19 at any given instant. Of course, under such circumstance, the longer the TRC "on" voltage generated by generator 24 in response to any given signal amplitude supplied to input 87 or preset thereinto, the higher the power output at terminals 81 and 82.

If so desired, diode 55 may also be considered as a safety device which conducts any time the voltage between the output of inductance 54 and B+ bussbar 38 exceeds a certain value.

From the foregoing, it may be seen that transistorized circuitry may be employed to an advantage in a sonar or other appropriate transmitter, even though the power requirements thereof are such that only vacuum tube circuitry could be employed for such purpose heretofore. Accordingly, the instant invention constitutes an advance in the art that has long been desired, and as such, its practical and legal significance deserves the recognition given herein.

The device of FIG. 5 operates in a manner substantially similar to that of the devices of FIGS. 1 and 2, except that a single TRC voltage control circuit 102 is used to control a plurality of inverters 103, 104, and 105, each of which produces a different frequency squarewave output signal for driving a like plurality of rectifiers 106, respectively. The output therefrom may, of course, be used for any suitable purpose, such as, for instance, to accomplish any or all of the objectives mentioned above.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A transmitter, comprising in combination:
   a power supply for producing a B+ voltage at the output thereof;
   a power transformer having a center tapped primary winding and a pair of secondary windings, with one of said pair of secondary windings constituting the output of said transmitter;
   a control signal generator means for producing a pair of switch drive signals and a time-ratio-control signal, the duration of which is inversely proportional to an input signal supplied thereto, at a trio of outputs thereof, respectively;
   a first transistorized switch means connected between one of the switch drive signal outputs of said control signal generator means and one of the terminals of the primary winding of said power transformer for effecting the closing thereof in response to one of said switch drive signals;
   a second transistorized switch means connected between the other switch drive signal output of said control signal generator means and the other terminal of the primary winding of said power transformer for effecting the closing thereof in response to the other of said switch drive signals; and
   means connected between the B+ output of said power supply, the time-ratio-control signal output of said control signal generator means, and the center tap of the primary winding of said power transformer for varying the current thereto an amount that is proportional to the duration of the time-ratio-control signal received from said control signal generator means.

2. The device of claim 1, further characterized by:
   means connected between the other of said pair of secondary windings of said power transformer and the control input of the time-ratio-control signal generating portion of the aforesaid control signal generator means and effectively to said current varying means for preventing an overload of said power transformer and said first and second transistorized switch means whenever the current supplied to the center tap of the primary winding of said power transformer exceeds a predetermined value.

3. The device of claim 1, wherein each of said first and second transistorized switch means comprises:
- a first transistor having a base, an emitter, and a collector, with the base thereof adapted for being connected for response to a predetermined switch drive signal produced by the aforesaid control signal generator means;
- a first diode having a cathode and an anode, with the cathode thereof connected to the base of said first transistor;
- a first resistor connected between the anode of said first diode and the emitter of said first transistor;
- a second transistor having a base, an emitter, and a collector, with the base thereof connected to the emitter of said first transistor, and with the collector thereof connected to the collector of said first transistor;
- a second diode having a cathode and an anode, with the cathode thereof connected to the base of said second transistor, and with the anode thereof connected to the anode of said first diode and to the emitter of said second transistor;
- a ground; and
- a second resistor connected between the emitter of said second transistor and said ground.

4. The device of claim 3 wherein said first and second transistors are SDT1012 and SDT8803 NPN transistors, respectively.

5. The invention of claim 3 further characterized by a diode having an anode and a cathode, with the cathode thereof connected to the collectors of said first and second transistors, and with the anode thereof connected to a predetermined one of the terminals of the primary winding of the aforesaid power transformer.

6. The device of claim 1, wherein said means connected between the B+ output of said power supply, the time-ratio-control signal output of said control signal generator means, and the center tap of the primary winding of said power transformer for varying the current thereto an amount that is proportional to the duration of the time-ratio-control signal received from said control signal generator means comprises:
- a ground;
- a capacitor having a pair of plates, with one of the plates thereof connected to said ground, and with the other plate thereof connected to the B+ voltage output of the aforesaid power supply;
- a transistorized gate having a trio of inputs and an output, with a pair of the inputs thereof connected to said ground and the B+ voltage output of the aforesaid power supply, respectively, and with the remaining input thereof connected to the time-ratio-control signal input of said control signal generator means;
- a choke having a pair of terminals, with one of the terminals thereof connected to the output of said transistorized gate; and
- a diode having a cathode and an anode, with the cathode thereof connected to the B+ voltage output of the aforesaid power supply, and with the anode thereof connected to the other terminal of said choke and the center tap of the primary winding of the aforesaid power transformer.

7. The device of claim 6, wherein said capacitor is a five hundred microfarad capacitor.

8. The device of claim 6, wherein said transistorized gate comprises:
- a first transistor having a base, an emitter, and a collector, with the base thereof connected to said control signal generator means for response to said time-ratio-control signal, and with the emitter thereof connected to the aforesaid ground;
- a diode having a cathode and an anode, with the cathode and anode thereof connected to the base and emitter of said first transistor, respectively;
- a second transistor having a base, an emitter, and a collector, with the emitter thereof connected to the B+ voltage output of the aforesaid power supply;
- a first resistor connected between the collector of said first transistor and the base of said second transistor;
- a second resistor connected between the base of said second transistor and the B+ voltage output of the aforesaid power supply;
- a third transistor having a base, an emitter, and a collector, with the base thereof connected to the collector of said second transistor, with the emitter thereof connected to said one terminal of said choke, and with the collector thereof connected to the B+ voltage output of said power supply; and
- a third resistor connected between the base and emitter of said third transistor.

9. The device of claim 6, wherein said choke is a three millihenry inductance.

10. The device of claim 6, wherein said diode is a 1N3600 transistorized diode.

* * * * *